United States Patent [19]

Roberts

[11] 4,373,789

[45] Feb. 15, 1983

[54] OPTICAL APPARATUS FOR APPLYING MAKE-UP

[76] Inventor: Lorraine J. Roberts, 301 Diplomat Plz., Morton, Tazewell County, Ill. 61550

[21] Appl. No.: 245,022

[22] Filed: Mar. 18, 1981

Related U.S. Application Data

[63] Continuation of Ser. No. 42,006, May 24, 1979, abandoned.

[51] Int. Cl.³ .......................... G02C 1/00; G02C 7/08; G02C 9/02
[52] U.S. Cl. .................................... 351/158; 351/41; 351/57; 351/58; 351/59
[58] Field of Search ....................... 351/41, 57, 58, 59, 351/63, 155, 158

[56] References Cited

U.S. PATENT DOCUMENTS

| 3,374,047 | 3/1968 | Gatchell . | |
|---|---|---|---|
| 3,936,156 | 2/1976 | Shaw et al. | 350/235 |
| 3,996,947 | 12/1976 | Szpur et al. | 132/79 G |

FOREIGN PATENT DOCUMENTS

| 13291 | of 1896 | United Kingdom | 351/155 |
|---|---|---|---|
| 952747 | 3/1964 | United Kingdom | 351/155 |

Primary Examiner—John K. Corbin
Assistant Examiner—Rodney B. Bovernick
Attorney, Agent, or Firm—James R. Bell

[57] ABSTRACT

Applying facial make-up, especially to the eyes, is difficult for those who wear prescription lenses. Optical aids are available but are generally inconvenient to carry and use due to their size and limited adjustability. A compact, optical apparatus is provided which may be easily carried in a purse, or the like, and is adjustable for use with an associated mirror.

1 Claim, 3 Drawing Figures

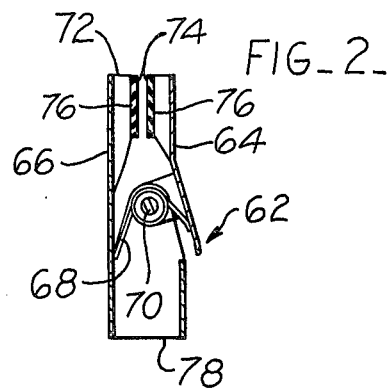
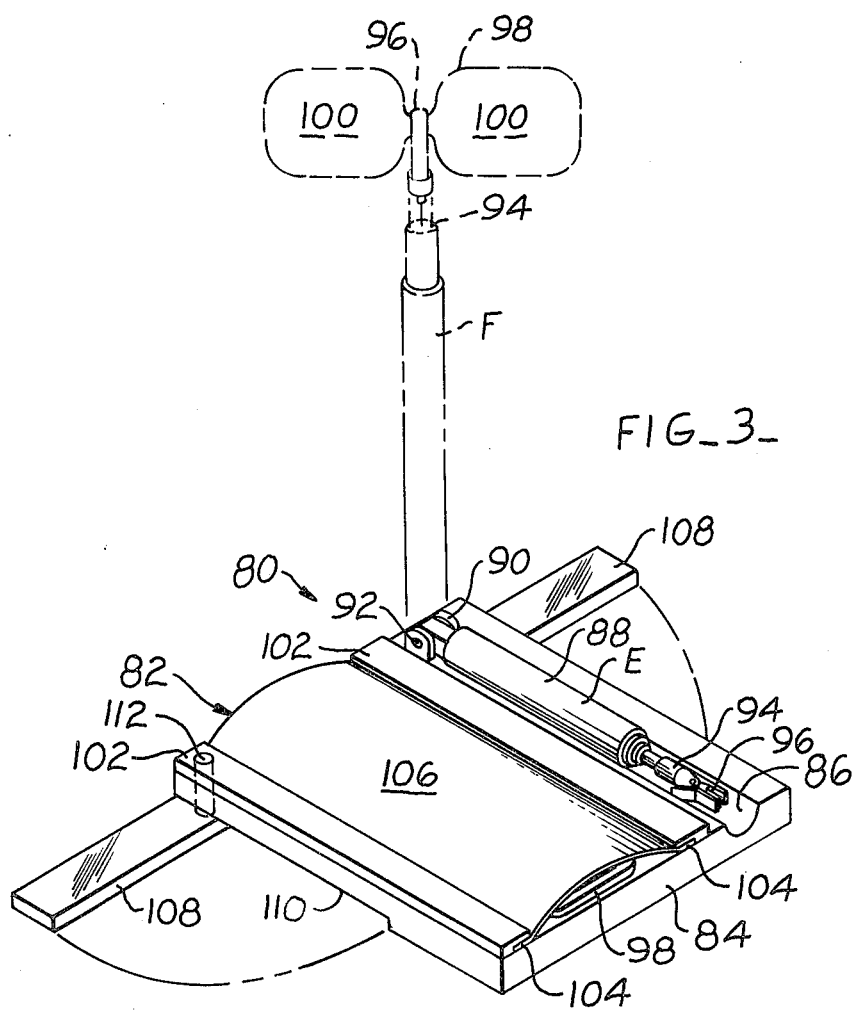

OPTICAL APPARATUS FOR APPLYING MAKE-UP

This is a continuation, of application Ser. No. 042,006 filed May 24, 1979 now abandoned.

DESCRIPTION

1. Technical Field

This invention relates generally to toilet articles and more particularly to toilet kits of the box or case type.

2. Background Art

In the past, optical-aids have been provided for use when facial make-up is to be applied by a person who wears prescription lenses. A problem with the aids which are presently known is that they are usually bulky, and not convenient to carry for use other than at home. Another problem with the known aids is that they are constructed and function in a manner which causes their use to be inconvenient.

In view of the above, it would be advantageous to provide an optical apparatus for applying make-up which is easily carried in a purse or the like, which is adjustable for convenient use with an associated mirror, and which overcomes the problems associated with the prior art.

DISCLOSURE OF INVENTION

In one aspect of the present invention, the problems pertaining to the known prior art, as set forth above, are advantageously avoided.

This is accomplished by providing an optical apparatus for applying make-up including a housing, a pair of prescription lenses, means for holding the lenses, and means for varying distance between the lenses and the housing by use of a telescoping member stored in the housing.

The foregoing and other advantages will become apparent from the following detailed description of the invention when considered in conjunction with the accompanying drawings. It is to expressly understood, however, that the drawings are not intended as a definition of the invention but are for the purpose of illustration only.

BRIEF DESCRIPTION OF THE DRAWINGS

In the drawings:

FIG. 2 is an enlarged isolated cross-sectional view illustrating a portion of this invention; and FIG. 3 is an isometric view illustrating an alternative embodiment of this invention.

BEST MODE FOR CARRYING OUT THE INVENTION

Figure 1:
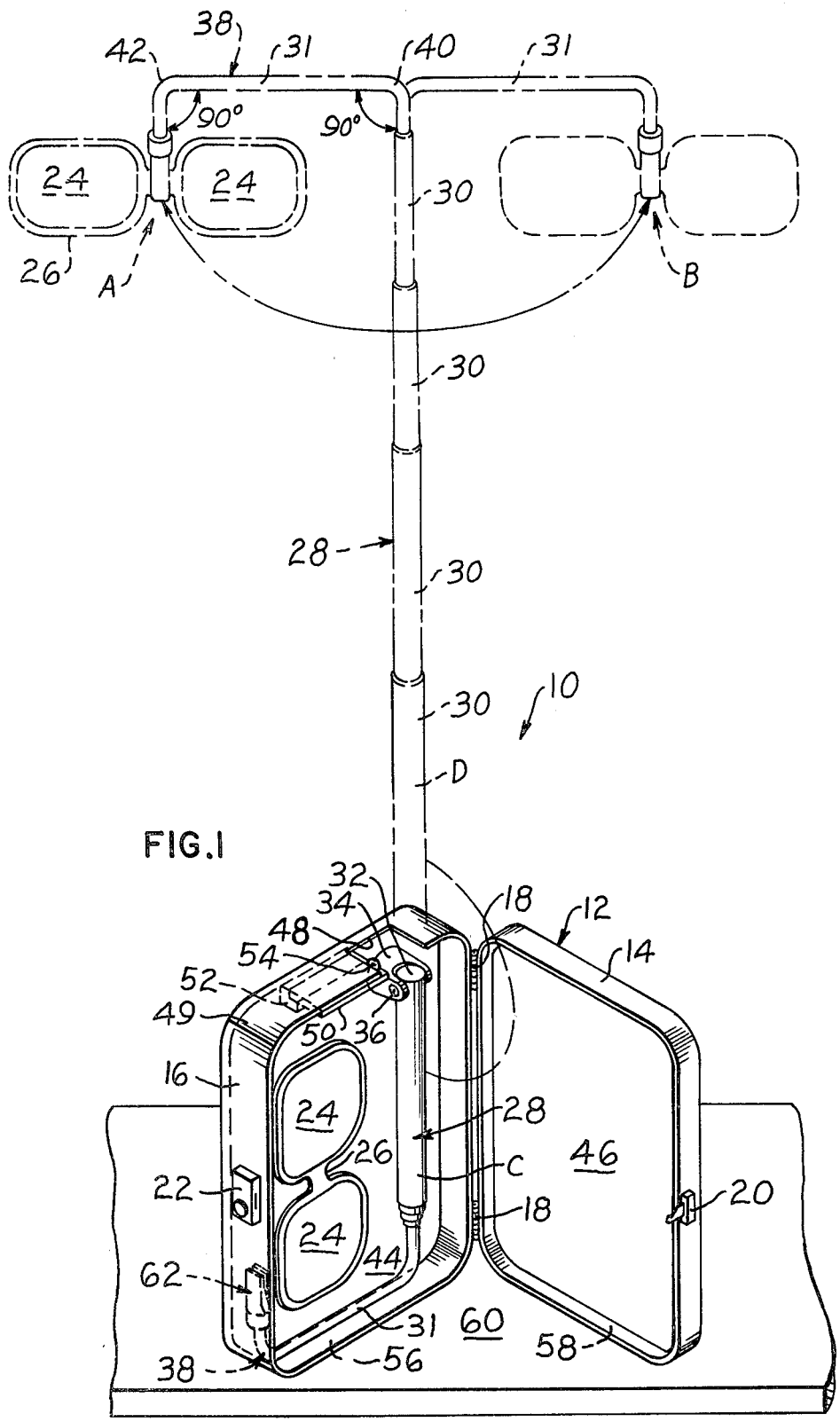
FIG. 1 is an isometric view illustrating the preferred embodiment of this invention.

A preferred optical apparatus is generally designated 10 in FIG. 1 and includes a housing 12 having a first closure member 14 connected to a second closure member 16 by well-known hinges 18. The housing is formed of a suitable synthetic material. A well-known latch 20 is attached to first closure 14 and an associated receptacle 22 is attached to closure 16 for receiving latch 20.

Closure 16 is of a construction sufficient for storing a pair of prescription lenses 24 mounted in a frame 26. Lenses 24 are matched to the prescription of the user and frame 26 is free of the well-known ear pieces which are otherwise required for eyeglasses to be worn on the users head. Frame 26 and lenses 24 are to be supported for use while applying eye make-up, thus the ear pieces are not required.

Closure 16 is also of a construction sufficient for storing a means for moving the lenses 24 relative to the housing 12 such as a telescoping member 28 which includes a plurality of relatively slidable and swivelable telescoping portions 30 extendable from housing 12. Member 28 may be of metal or a suitable synthetic material. A first end 32 of telescoping member 28 is pivotally attached in housing 12 at a pivotal base 34 and a pin 36. Generally, telescoping member 28 is similar to a well-known antenna of the type commonly associated with radios and similar communication equipment. A portion 31, at a second end 38 of telescoping member 28, is curved or bent 90 degrees at each of the locations designated 40 and 42. However, it is recognized that one arcuate bend of 180 degrees would be appropriate if preferred. The portions 30,31 can swivel for relative movement between a position designated "A" and a position designated "B". Closure member 14 may be substantially flat since no storage room is necessary therein. A surface 44 of closure 16 and a surface 46 of closure 14 preferably include a protective lining, such as velvet or the like, to avoid scratching lenses 24.

A slot 48 is formed in end 49 of closure 16 adjacent first end 32 of telescoping member 28 for permitting member 28 to be pivoted at pin 36 from a position designated "C" in housing 12 and extend through slot 48 to a position designated "D" and returned when desired to position "C". A means for opening and closing slot 48, such as a slide or cover 50, is attached to closure 16. A slotted guide 52 is attached to closure 16 for guiding slide 50 and a tab 54 is preferably attached for manually moving slide 50.

Hinges 18 permit relative pivotal movement of closure 14,16 to an open position wherein the closures 14,16 support housing 12 as illustrated in FIG. 1. In the open position, end 56 of closure 16 and end 58 of closure 14 engage a base 60 such as a table or vanity top or the like. Thus, housing 12 is supported to stand on the ends 56,58.

Means are provided for releasably holding frame 26 and lenses 24 such as a well-known alligator clip device 62 including a first clamp member 64 resiliently urged toward a second clamp member 66 by a spring 68. The first and second clamp members 64,66, respectively, and the spring 68 are commonly connected at a pin 70, see FIG. 2. A first end 72 of clip 62 includes a padding 74 such as sponge or the like, adhered to opposed faces 76 for engagement with frame 26 so as to avoid scratching the frame 26. A second end 78 of clip 62 is of a construction sufficient to be mounted on second end 38 of telescoping member 28.

An alternative optical apparatus is generally designated 80 in FIG. 3 and includes a housing 82 having a base 84 which may be of wood or a suitable synthetic material. Base 84 includes a groove 86 formed therein for storing an extendable member 88 in a retracted position designated "E". Member 88 is connected to base 84 at a first or pivot end 90 and a pin 92. A second end 94 of member 88 includes a clip device 96. Note however that second end 94 of member 88 does not include a bent portion such as that designated 31 in FIG. 1. Returning to FIG. 3, member 88 is extendable to a position designated "F" wherein a frame 98 and prescription lenses 100 are held by clip device 96.

A means for storing lenses 100 and frame 98, such as a flexible case 106, is connected to base 84 by a pair of strips 102 which overlap opposite edges 104 of case 106. Strips 102 are secured to base 84 by a suitable adhesive or the like. Flexible case 106 is of a well-known type commonly used for storing prescription glasses and usually formed of leather or a synthetic material.

Means are provided for stabilizing housing 82 when member 88 is extended to the position designated "F" and holding frame 98 and lenses 100. Such means includes legs 108 stored in slots 110 formed in base 84 and pivotable at pin 112 to extend from base 84.

Industrial Applicability

With the parts combined as set forth above it can be seen that when eye make-up is to be applied, a wearer of prescription lenses first removes eyeglasses and then opens housing 12 by separating latch 20 from receptacle 22. Closures 14 and 16 are then pivoted open. Ends 56,58 engage surface 60 for supporting housing 12 upright as shown in FIG. 1.

Slide 50 is manually moved to open slot 48 and member 28 is pivoted from position C, through slot 48, to position D. Portions 30,31 are extended and frame 26 is secured in clip 62. The apparatus 10 is then positioned relative to a mirror such as that on a bathroom vanity, or the like. The user then positions for focused viewing through lenses 24 into the mirror. Eye make-up is then applied without the obstruction of eyeglasses.

Once the make-up is applied, frame 26 is placed into closure member 16 and member 28 is retracted and pivoted into closure 16. Slide 50 is moved to close slot 48 and closures 14,16 are latched at 20,22. The optical apparatus is of a convenient size for storage in a purse.

The foregoing has described an optical apparatus for applying make-up which is easily carried and which is adjustable for convenient use with an associated mirror.

Other aspects, objects and advantages of this invention can be obtained from a study of the drawings, the disclosure and the appended claims.

I claim:

1. An optical apparatus for applying make-up comprising,
   a housing having a first closure member and a second closure member and a slot formed in the housing, said members being hinged together and adapted to be opened;
   a pair of prescription lenses removably mounted in the housing;
   means for opening and closing the slot, said means being a cover mounted on the housing adjacent the slot;
   an extendable member pivotable at a first end from a first position in the housing adjacent the slot to a second position extending from the housing through the slot; and
   means for holding the lenses, said means being attached to a second end of said extendable member, wherein said housing in its open position will stand on its ends when said extendable member is positioned through said slot.

* * * * *